United States Patent
Eschbach et al.

(10) Patent No.: US 8,090,141 B2
(45) Date of Patent: Jan. 3, 2012

(54) SYSTEM AND METHOD TO AUTOMATICALLY ESTABLISH PREFERRED AREA FOR IMAGE-WISE WATERMARK

(75) Inventors: Reiner Eschbach, Webster, NY (US); Shen-ge Wang, Fairport, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1565 days.

(21) Appl. No.: 11/343,668

(22) Filed: Jan. 31, 2006

(65) Prior Publication Data
US 2007/0177759 A1    Aug. 2, 2007

(51) Int. Cl.
G06K 9/00 (2006.01)
H04N 1/40 (2006.01)
G09C 3/00 (2006.01)

(52) U.S. Cl. .................. 382/100; 358/3.28; 380/54
(58) Field of Classification Search .......... 380/210; 382/100, 210
See application file for complete search history.

(56) References Cited

U.S. PATENT DOCUMENTS

| | | | |
|---|---|---|---|
| 3,784,289 A | 1/1974 | Wicker | |
| 4,149,194 A | 4/1979 | Holladay | |
| 4,210,346 A | 7/1980 | Mowry et al. | |
| 4,310,180 A | 1/1982 | Mowry et al. | |
| 5,087,507 A | 2/1992 | Heinzer | |
| 5,181,254 A | 1/1993 | Schweizer et al. | |
| 5,234,783 A | 8/1993 | Ng | |
| 5,284,364 A | 2/1994 | Jain | |
| 5,450,502 A | 9/1995 | Eschbach et al. | |
| 5,487,567 A | 1/1996 | Volpe | |
| 5,488,649 A | 1/1996 | Schellinger | |
| 5,583,660 A | 12/1996 | Rylander | |
| 5,678,133 A | 10/1997 | Siegel | |
| 5,695,220 A | 12/1997 | Phillips | |
| 5,710,636 A | 1/1998 | Curry | |
| 5,734,752 A | 3/1998 | Knox | |
| 5,751,432 A | 5/1998 | Gwaltney | |
| 5,788,285 A | 8/1998 | Wicker | |
| 5,790,703 A | 8/1998 | Wang | |
| 5,825,892 A | 10/1998 | Braudaway et al. | |

(Continued)

FOREIGN PATENT DOCUMENTS
EP     0859506     8/1998

(Continued)

OTHER PUBLICATIONS

Reed, A.; Rogers, E.; , "Color image appearance model applied to printing of watermarked images," Acoustics, Speech, and Signal Processing, 2004. Proceedings. (ICASSP '04). IEEE International Conference on , vol. 3, No., pp. iii-89-92 vol. 3, May 17-21, 2004; doi: 10.1109/1CASSP.2004.1326488.*

(Continued)

*Primary Examiner* — Brian Werner
*Assistant Examiner* — Nirav G Patel
(74) *Attorney, Agent, or Firm* — Duane C. Basch; Basch & Nickerson LLP (57) ABSTRACT

A system and method are disclosed for determining preferred image locations for placing watermark information (both hidden and obvious). The disclosure includes at least three criteria (image similarity, contrast, and image value range) that may be used alone or in combination to determine a preferred area of the target image for placing the watermark depending upon the user's intent for the mark (hiding or showing watermark).

8 Claims, 8 Drawing Sheets

U.S. PATENT DOCUMENTS

| | | | |
|---|---|---|---|
| 5,853,197 A | 12/1998 | Mowry et al. | |
| 5,901,224 A * | 5/1999 | Hecht | 713/179 |
| 5,905,819 A | 5/1999 | Daly | |
| 5,946,103 A | 8/1999 | Curry | |
| 5,946,414 A | 8/1999 | Cass et al. | |
| 5,949,055 A | 9/1999 | Fleet et al. | |
| 5,995,638 A | 11/1999 | Amidror et al. | |
| 6,031,914 A | 2/2000 | Tewfik et al. | |
| 6,036,233 A | 3/2000 | Braun et al. | |
| 6,061,793 A | 5/2000 | Tewfik et al. | |
| 6,108,512 A | 8/2000 | Hanna | |
| 6,192,138 B1 | 2/2001 | Yamadaji | |
| 6,252,971 B1 | 6/2001 | Wang | |
| 6,268,866 B1 | 7/2001 | Shibata | |
| 6,304,345 B1 | 10/2001 | Patton et al. | |
| 6,332,194 B1 | 12/2001 | Bloom et al. | |
| 6,439,465 B1 | 8/2002 | Bloomberg | |
| 6,456,745 B1 | 9/2002 | Bruton et al. | |
| 6,572,025 B1 | 6/2003 | Nishikado et al. | |
| 6,606,168 B1 | 8/2003 | Rylander | |
| 6,707,928 B2 * | 3/2004 | Acharya et al. | 382/100 |
| 6,714,320 B1 | 3/2004 | Nakahara et al. | |
| 6,731,775 B1 | 5/2004 | Ancin | |
| 6,741,758 B2 | 5/2004 | Hayashi et al. | |
| 6,744,448 B1 | 6/2004 | Bernard et al. | |
| 6,763,121 B1 | 7/2004 | Shaked et al. | |
| 6,813,710 B1 | 11/2004 | Wu et al. | |
| 6,823,075 B2 | 11/2004 | Perry | |
| 6,873,711 B1 | 3/2005 | Murakami et al. | |
| 6,882,737 B2 * | 4/2005 | Lofgren et al. | 382/100 |
| 6,906,825 B1 | 6/2005 | Nakahara et al. | |
| 6,956,958 B2 | 10/2005 | Fan et al. | |
| 7,020,349 B2 | 3/2006 | Brunk | |
| 7,092,128 B2 | 8/2006 | Wang et al. | |
| 7,126,721 B2 | 10/2006 | Wang et al. | |
| 7,139,101 B2 | 11/2006 | Loce et al. | |
| 7,139,521 B2 | 11/2006 | Ng et al. | |
| 7,148,999 B2 | 12/2006 | Xu et al. | |
| 7,180,631 B2 | 2/2007 | Ide et al. | |
| 7,180,635 B2 | 2/2007 | Wang et al. | |
| 7,193,751 B2 | 3/2007 | Wang et al. | |
| 7,352,493 B2 | 4/2008 | Liu et al. | |
| 7,515,732 B2 | 4/2009 | Fan et al. | |
| 2001/0026616 A1 | 10/2001 | Tanaka | |
| 2002/0090107 A1 | 7/2002 | Acharya et al. | |
| 2002/0178362 A1 | 11/2002 | Kwon | |
| 2003/0123661 A1 * | 7/2003 | Oh et al. | 380/210 |
| 2003/0152225 A1 | 8/2003 | Kunisa | |
| 2003/0210784 A1 * | 11/2003 | Noridomi et al. | 380/202 |
| 2004/0052401 A1 * | 3/2004 | Suzaki | 382/100 |
| 2005/0025333 A1 | 2/2005 | Fujii et al. | |
| 2005/0031160 A1 | 2/2005 | Shaked et al. | |
| 2005/0123194 A1 | 6/2005 | Fan et al. | |
| 2005/0128523 A1 | 6/2005 | Liu et al. | |
| 2005/0128524 A1 | 6/2005 | Liu et al. | |
| 2005/0135851 A1 | 6/2005 | Ng et al. | |
| 2005/0259844 A1 | 11/2005 | Kot et al. | |
| 2005/0286083 A1 | 12/2005 | Wang et al. | |
| 2006/0044617 A1 | 3/2006 | Wang et al. | |
| 2006/0072159 A1 | 4/2006 | Eschbach et al. | |
| 2006/0127117 A1 | 6/2006 | Eschbach et al. | |
| 2007/0047760 A1 * | 3/2007 | Sharma et al. | 382/100 |
| 2007/0139714 A1 | 6/2007 | McElvain | |
| 2008/0270801 A1 * | 10/2008 | Levy et al. | 713/179 |

FOREIGN PATENT DOCUMENTS

| | | |
|---|---|---|
| EP | 0926897 | 6/1999 |
| EP | 1316917 | 6/2003 |
| EP | 1705531 | 3/2005 |
| EP | 1705529 | 9/2006 |
| GB | 2217258 | 10/1989 |
| JP | 2001-320569 | 11/2001 |
| WO | WO9963443 | 12/1999 |
| WO | WO2005122080 | 12/2005 |

OTHER PUBLICATIONS

Reed, A.; Rogers, E.; , "Color image appearance model applied to printing of watermarked images," Acoustics, Speech, and Signal Processing, 2004. Proceedings. (ICASSP '04). IEEE International Conference on , vol. 3, No., pp. iii-89-92 vol. 3, May 17-21, 2004.*

Z. Fan et al.; U.S. Appl. No. 10/082,535, filed Feb. 21, 2002; Method of Embedding Color Information in Printed Documents Using Watermarking.

An unofficial office action issued Nov. 16, 2010 for Japanese patent application 2007-015729, published Aug. 16, 2007 as JP2007-208980, corresponding to instant U.S. Appl. No. 11/343,668.

A machine translation and abstract of JP2001320569 published Nov. 16, 2001, applicant Canon KK.

An unofficial European Search Report dated Nov. 30, 2010 for European patent application EP 07101495.5 corresponding to U.S. Appl. No. 11/343,668.

Kankanhalli M S et al: "Adaptive visible watermarking of images", Multimedia Computing and Systems, 1999. IEEE International Conference on Florence, Italy Jun. 7-11, 1999, Los Alamitos, CA, USA, IEEE Comput. SOC, US, vol. 1, Jun. 7, 1999, pp. 568-573, XP010342828, DOI: 001:10.1109/MMCS.1999,779263 ISBN:978-0-7695-0253-3.

Wolfgang et al: "Perceptual Watermarks for Digital Images and Video", Proceedings of the IEEE, IEEE, New York, US, vol. 87, No. 7, Jul. 1, 1999, 20 pages; XP011044240, ISSN: 0018-9219.

JPA 2007-15729—An Unofficial Office Action Issued Aug. 12, 2011 for Japanese Patent Application 2007-15729 Published Aug. 16, 2007, As 2007-208980; Inventor: Reiner Eschbach et al.; JPA 2007-15729 Corresponds to Subject Application.

JPA 2007-15729—An Unofficial Summarized Translation of an Office Action Issued Aug. 12, 2011 for Japanese Patent Application 2007-15729 Published Aug. 16, 2007, As 2007-208980; Inventor: Reiner Eschbach et al.; JPA 2007-15729 Corresponds to Subject Application.

Bender et al.; Techniques for Data Hiding; SPIE vol. 2420, pp. 164-173, 1995.

Tanaka et al.; Tanaka, Kiyoshi; Nakamura, Yasuhiro; New Integrated Coding Schemes for Computer-aided Facsimile; IEEE, 1990. pp. 275-281.

Knox et al.; Knox, Keith; Wang, Shen-ge; Digital watermarks using stochastic screens; SPIE vol. 3018, 1997; pp. 316-322.

Tanaka et al.; Tanaka, Kiyoshi; Nakamura, Yasuhiro; Matsui, K.; Embedding the attribute Information into a Dithered Image; Systems and Computers in Japan, vol. 21, No. 7, 1990, pp. 43-50.

Nakamura et al; Nakamura, Yasuhiro; Matsui, K.; "A unified coding method of dithered image and text data using micropatterns"; Electronics and Communications in Japan—Part 1 Communications; vol. 72, Issue 4, pp. 50-56, Apr. 1989.

An Unofficial File History of US Patent 7,515,732, Apr. 7, 2009.
An Unofficial File History of US Patent 6,956,958, Oct. 18, 2005.
An Unofficial File History of US Patent 7,352,493, Apr. 1, 2008.

* cited by examiner

| 107 | 105 | 105 | 108 | 108 | 108 | 113 | 115 | 107 | 106 | 105 | 103 | 106 | 109 | 111 | 112 | 121 | 114 | 111 | 113 |
|---|---|---|---|---|---|---|---|---|---|---|---|---|---|---|---|---|---|---|---|
| 119 | 115 | 114 | 108 | 112 | 108 | 107 | 103 | 101 | 101 | 100 | 99 | 102 | 95 | 95 | 99 | 97 | 95 | 96 | 94 |
| 190 | 187 | 180 | 180 | 183 | 177 | 173 | 166 | 159 | 151 | 144 | 140 | 137 | 134 | 129 | 122 | 120 | 109 | 101 | 97 |
| 161 | 156 | 150 | 156 | 160 | 164 | 171 | 176 | 164 | 180 | 184 | 185 | 182 | 180 | 180 | 177 | 176 | 179 | 174 | 181 |
| 143 | 143 | 140 | 139 | 142 | 140 | 140 | 124 | 77 | 159 | 150 | 153 | 155 | 155 | 150 | 153 | 145 | 145 | 146 | 138 |
| 139 | 134 | 141 | 138 | 136 | 130 | 133 | 123 | 87 | 108 | 133 | 138 | 136 | 141 | 137 | 136 | 133 | 139 | 144 | 127 |
| 119 | 135 | 138 | 138 | 145 | 145 | 144 | 133 | 27 | 47 | 142 | 147 | 140 | 135 | 140 | 137 | 113 | 143 | 144 | 144 |
| 76 | 68 | 67 | 71 | 73 | 84 | 83 | 57 | 11 | 19 | 72 | 81 | 76 | 76 | 68 | 51 | 21 | 78 | 74 | 74 |
| 108 | 112 | 108 | 112 | 104 | 103 | 101 | 44 | 9 | 22 | 54 | 104 | 110 | 111 | 103 | 49 | 47 | 109 | 109 | 105 |
| 111 | 126 | 126 | 123 | 116 | 113 | 108 | 26 | 8 | 20 | 38 | 99 | 97 | 90 | 57 | 11 | 66 | 115 | 123 | 123 |
| 57 | 61 | 68 | 70 | 66 | 65 | 79 | 33 | 10 | 30 | 54 | 112 | 94 | 39 | 11 | 2 | 44 | 62 | 63 | 65 |
| 67 | 68 | 68 | 72 | 81 | 101 | 92 | 72 | 21 | 41 | 73 | 85 | 121 | 43 | 14 | 15 | 79 | 82 | 78 | 77 |
| 43 | 42 | 41 | 41 | 40 | 120 | 109 | 78 | 44 | 44 | 60 | 77 | 61 | 24 | 13 | 20 | 27 | 27 | 27 | 26 |
| 15 | 15 | 14 | 14 | 27 | 135 | 102 | 62 | 67 | 53 | 52 | 66 | 15 | 6 | 3 | 11 | 5 | 5 | 5 | 6 |
| 1 | 1 | 1 | 1 | 47 | 88 | 83 | 69 | 74 | 70 | 83 | 26 | 2 | 2 | 1 | 12 | 4 | 5 | 6 | 7 |
| 1 | 1 | 2 | 2 | 55 | 87 | 96 | 81 | 78 | 73 | 65 | 22 | 56 | 67 | 24 | 9 | 98 | 110 | 121 | 131 |
| 93 | 108 | 119 | 112 | 55 | 42 | 103 | 88 | 93 | 77 | 64 | 46 | 31 | 37 | 48 | 3 | 142 | 163 | 161 | 168 |
| 153 | 148 | 142 | 102 | 16 | 13 | 33 | 113 | 146 | 118 | 85 | 114 | 43 | 32 | 66 | 19 | 93 | 122 | 129 | 158 |
| 113 | 131 | 125 | 22 | 72 | 87 | 82 | 116 | 132 | 115 | 141 | 126 | 57 | 31 | 53 | 49 | 19 | 67 | 115 | 133 |
| 26 | 33 | 64 | 76 | 87 | 94 | 95 | 127 | 105 | 97 | 132 | 119 | 96 | 99 | 100 | 103 | 110 | 123 | 133 | 136 |

SYSTEM AND METHOD TO AUTOMATICALLY ESTABLISH PREFERRED AREA FOR IMAGE-WISE WATERMARK

CROSS-REFERENCE TO RELATED APPLICATIONS

Cross-reference is made to the following co-pending application, which is also hereby incorporated by reference in its entirety:

U.S. patent application Ser. No. 11/034,131 (Publ. No. 20050123194 A1) for "METHOD OF EMBEDDING COLOR INFORMATION IN PRINTED DOCUMENTS USING WATERMARKING," by Z. Fan et al., filed Jan. 12, 2005, a divisional of U.S. patent application Ser. No. 10/082,535, filed Feb. 21, 2002.

Disclosed is a system and method for determining preferred image locations for placing watermark information for both hidden and obvious marks, and more particularly the use of at least one of three criteria (image similarity, contrast, and image value range) to determine the best area of hiding or showing the watermark, depending upon the user's intent for the mark.

BACKGROUND AND SUMMARY

It is known to use digital watermarks, and to obtain such marks by embedding a digital string into an image. The digital watermarks can be created either in a spatial domain or in a transform domain. In transform domain digital watermarking, the digital string is embedded using a transformation space, such as Fourier transform or the like, to obtain a spread spectrum characteristic of noise insensitivity. Correspondingly, the digital watermark is not an image and can not be simply reconstructed or verified optically, though the actually encoded digital watermark data can be arbitrary, thus also an image in some other transform domain. An example of spatial domain digital watermarking is found in U.S. Pat. No. 6,252,971 to S. Wang, for "DIGITAL WATERMARKING USING PHASE-SHIFTED STOCLUSTIC SCREENS," issued Jun. 26, 2001, where the watermark can be reconstructed as image directly in the space domain.

Classical watermarks are image-wise watermarks, meaning that they can be viewed by a user, normally to verify authenticity, but often only to establish a perception of value or beauty. Image-wise digital watermarks exist in the form of glossmarks, correlation marks and embedded image watermarks as described, for example in U.S. patent application Ser. No. 11/034,131 (above), as well as U.S. patent application Ser. No. 10/876,001 (U.S. Publ. 20050128524 A1), for "ENHANCEMENT OF GLOSSMARK IMAGES AT LOW AND HIGH DENSITIES," by Liu et al., filed Jun. 24, 2004, also incorporated herein by reference in its entirety.

The advantage of such watermarks is that they more closely resemble classical watermarks, albeit with the added capability of variable content. This variable content, however, also directly interacts with the background image and a truly automated use of variable watermarks requires the correct positioning (or identification of the watermark location) based on the watermark content and the image content. In other words, when an image-wise watermark is to be employed, and it is desirable to either make the mark visible or to hide the mark, the "best" or preferred position at which such a mark should be reproduced in the image is strongly dependent upon the nature of the mark as well as the image—where simply repositioning the mark within an image may significantly alter the detectability (desired/undesired) of a mark.

U.S. Pat. No. 6,956,958, by Z. Fan et al. "METHOD OF EMBEDDING COLOR INFORMATION IN PRINTED DOCUMENTS USING WATERMARKING", issued Oct. 18, 2005, describes a method of enhancing color fidelity in multi-reproduction that includes an encoding part, which usually resides in a printer (or the printing part of a copier, but may also be resident in software stored in a computer) and a decoding part which usually resides in a scanner (or the scanning part of a copier, but may also be resident in software stored in a computer) so as to add color fidelity information directly to the output print. Each part can be divided into layers where the top layers are responsible for management of color information while the bottom layers are responsible for embedding/detection of digital watermarks containing the color information.

Accordingly, the present disclosure is directed to a system and a method for determining preferred image locations for placing watermark information for both hidden and obvious marks. Preferred locations provide either a high degree of hiding or visibility depending on the goal. At least three metrics may be employed in making a determination of a preferred position of a watermark, including (i) image value, (ii) image/watermark value similarity, and (iii) image/watermark contrast similarity.

Disclosed in embodiments herein is a method for determining a location for an image-wise watermark in relation to a target image, comprising: analyzing the target image by dividing the target image into a plurality of smaller areas and determining a characteristic metric for the areas thereof; and determining, based upon the characteristic metric, at least one location for the watermark image to be overlaid onto the target image.

Also disclosed in embodiments herein is a print production system for determining a location for an image-wise watermark in relation to a target image, comprising: a processor for analyzing the target image by dividing the target image into a plurality of smaller areas and determining a characteristic metric for the areas thereof; memory for recording the characteristic metric data for each of the areas analyzed by the processor; said processor further determining, based upon the characteristic metric, at least one location for a watermark image to be overlaid onto the target image, and overlaying said watermark image on the target image in the at least one location; and a printing engine for receiving the target image with the overlaid watermark image and rendering the image on a substrate.

Further disclosed in embodiments herein is a method for printing variable data with a watermark, comprising: receiving a target image into which an image-wise watermark is to be embedded; receiving a watermark image; analyzing the target image by dividing the target image into a plurality of smaller areas and determining a characteristic metric for the areas thereof; analyzing the watermark image by dividing the watermark image into a plurality of smaller areas and determining a characteristic metric for the areas thereof; and determining, based upon at least one of the characteristic metrics, at least one location for the watermark image to be overlaid onto the target image.

DETAILED DESCRIPTION

In the case of image-wise watermarking, two possible applications/intentions can be considered as the extreme cases, and all intermediate cases can be derived from two end points established by the extreme cases. In the first case, the watermark is intended to be as unobtrusive as possible, and in the second case, the watermark is intended to be clearly visible. An example of the first scenario is where the image-wise watermark is intended to be completely hidden. An example of the second scenario is a variable data glossmark storing, for example a serial number, on a photo.

The "best" area for embedding a watermark can generally be found following a combination of one or more of three criteria: (i) image/watermark value similarity; (ii) image/watermark contrast similarity; and (iii) image value range. As will be appreciated based upon the following discussion, the use of the criteria may be independent of one another, or two or more criteria may be combined using a weighted average or similar approach so as to optimize the placement of the watermark in order to achieve a desired objective of the watermark (e.g., maximize or minimize visibility).

Generally speaking, with respect to the image/watermark value similarity criteria, if the target image and the watermark image information are similar, the watermark will be more subtle or less detectable. On the other hand, if they are dissimilar, the watermark will be more obvious or apparent. As for the image/watermark contrast similarity, if the contrast of the target image is high, watermark contrast will be lost, and vice versa. Lastly, for the image value range criteria, since all watermarks are created by modulating the input image, sufficient image data must be present locally to serve as an information carrier (to carry the overlaid watermark image).

Figure 1:
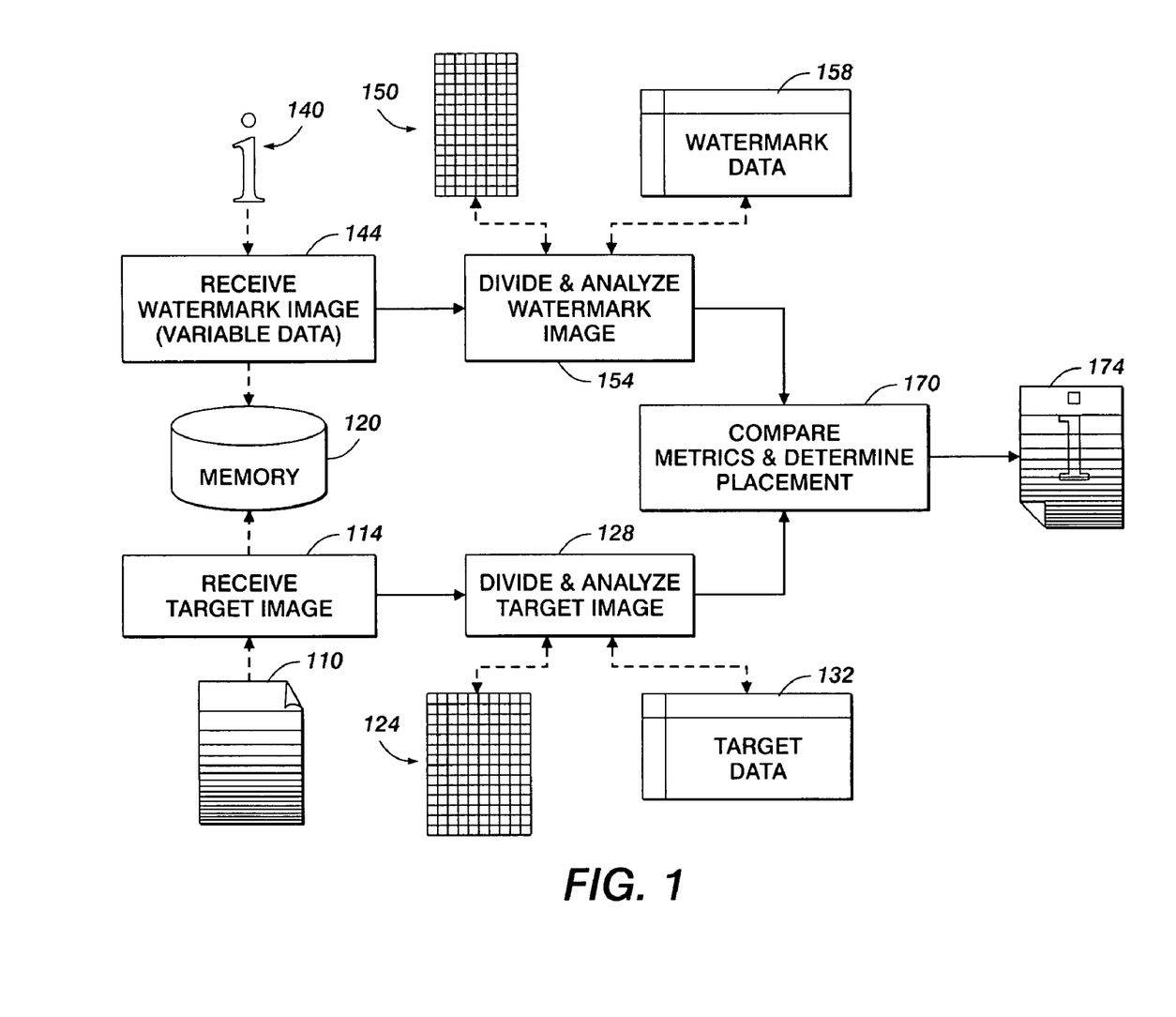
FIG. 1 is a schematic illustration of a system and method for carrying out an embodiment of the invention.
Figure 2:
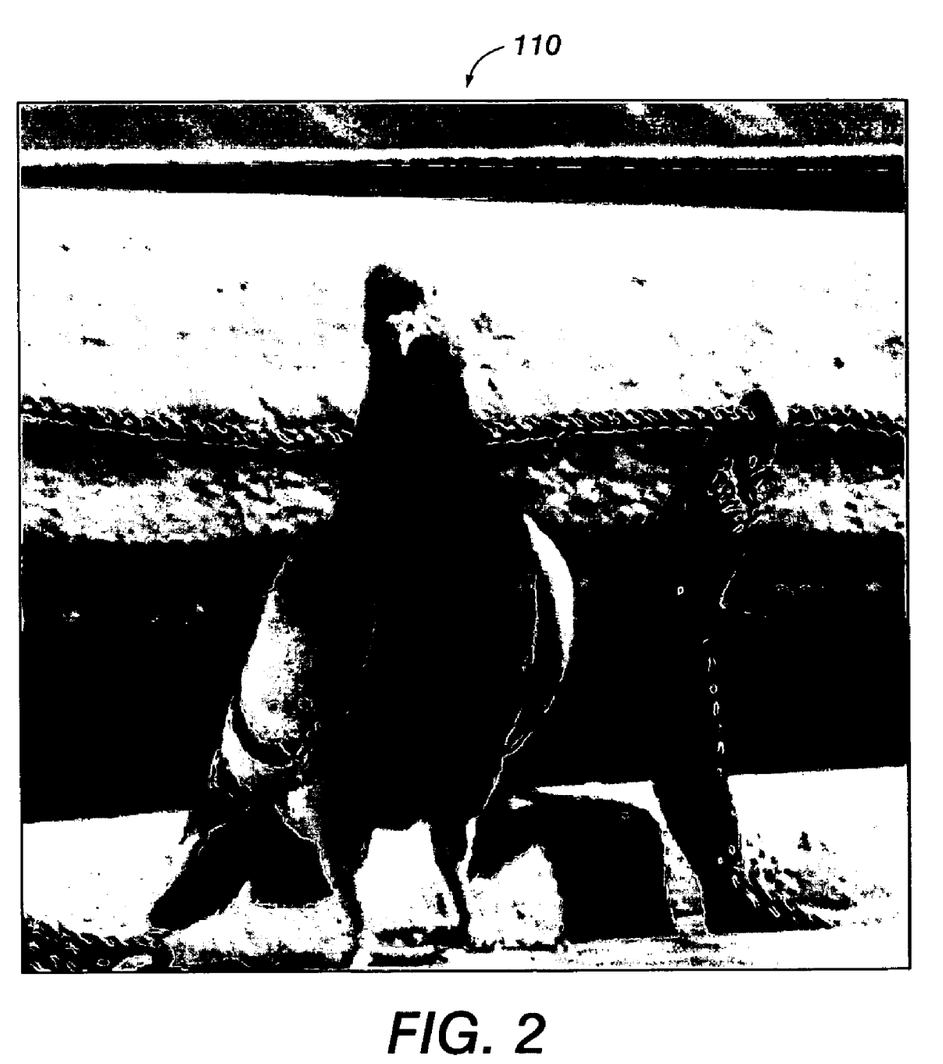
FIG. 2 is an illustrative example of a target image in accordance with an aspect of the disclosed embodiments.

Having described the general considerations used to select locations for a watermark to be overlaid on a target image, attention is now directed to a more detailed discussion relative to each of the possible criteria used to determine a location. Referring to FIG. 1, in one embodiment the image value similarity criteria computes a gray-level based variance (if the absolute brightness of the watermark is not fixed, the calculation can be done bias independent). In order to do this, the input or target image 110 is first received or retrieved from a storage medium or memory 114 as indicated by operation 120. An example of a target image is shown in FIG. 2. Next, the target image is divided into or reduced to a small set of image areas 124, for example about 20×20 areas, as represented by operation 128. In the analysis phase of operation 128, the average gray level of the target image areas is computed and stored as target data 132.

In a similar manner, the watermark image 140, having been received and/or stored in memory, operation 144, is also reduced in size to a substantially smaller number of areas, say 4×4, as depicted at 154. The divided watermark image is characterized as indicated by reference numeral 150, and the associated characteristic metric data indicated as 158. An example of a watermark image is depicted in FIG. 4

Processing of the images in this manner can be justified by the application, where the watermark only covers a certain area of the image, or is replicated at several points in a target image, with one of the replications being in an optimized spot, or by identifying important and not so important areas of the watermark. In general, it can be said that if a position can be chosen, it also means that the watermark must be smaller than the target image; otherwise, no choice would be available. Moreover, while the disclosed embodiment is directed to particular images and relative number of areas or sections it should be recognized that these are illustrative examples, and that the systems and methods described relative to the examples have broad application and are not necessarily limited by the example images or the exemplary analysis details set forth.

Figure 3:
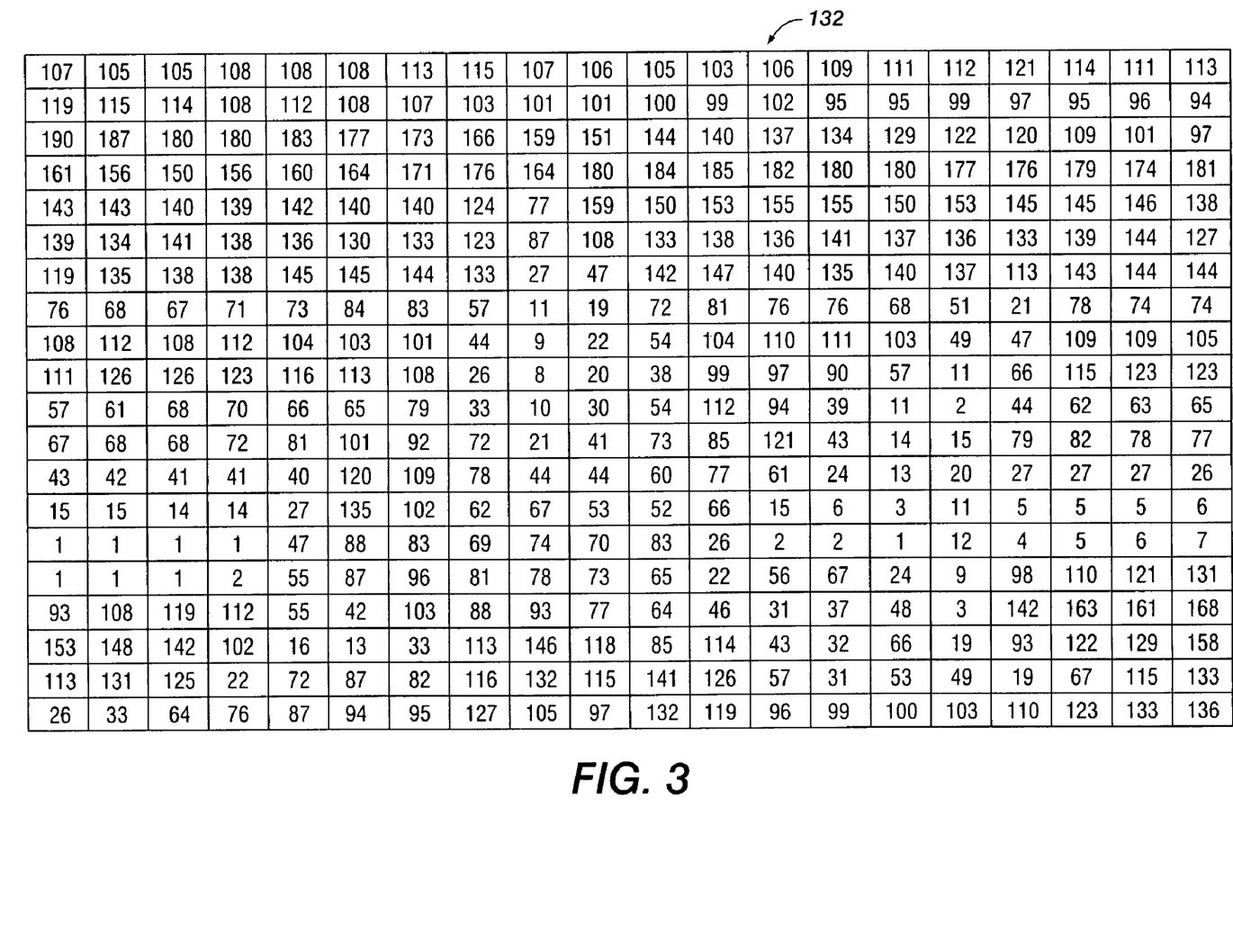
FIG. 3 is an illustrative example of the data derived from an analysis of areas of FIG. 2.
Figure 5:
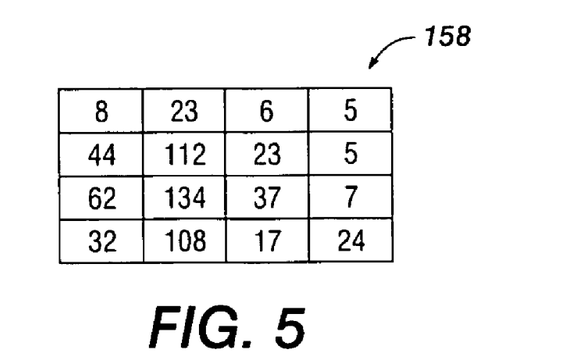
FIG. 5 is an illustrative example of the data derived from an analysis of areas of FIG. 4.

FIG. 2 shows an example target image and FIG. 3 the corresponding area entries indicating the average intensity values for each of the 20×20 image areas. The array 132 of average intensity data depicted in FIG. 5 is an example of the data that is described above as being derived from the target image. It should be noted that the number of areas (e.g., 20×20) is chosen somewhat arbitrarily and that equivalent calculations can also be performed on various array sizes. It is also the case that equivalent calculations can be performed for color images and color image data by, for example, looking at the luminance for scalar data or by looking at the color for vector computations.

Figure 4:
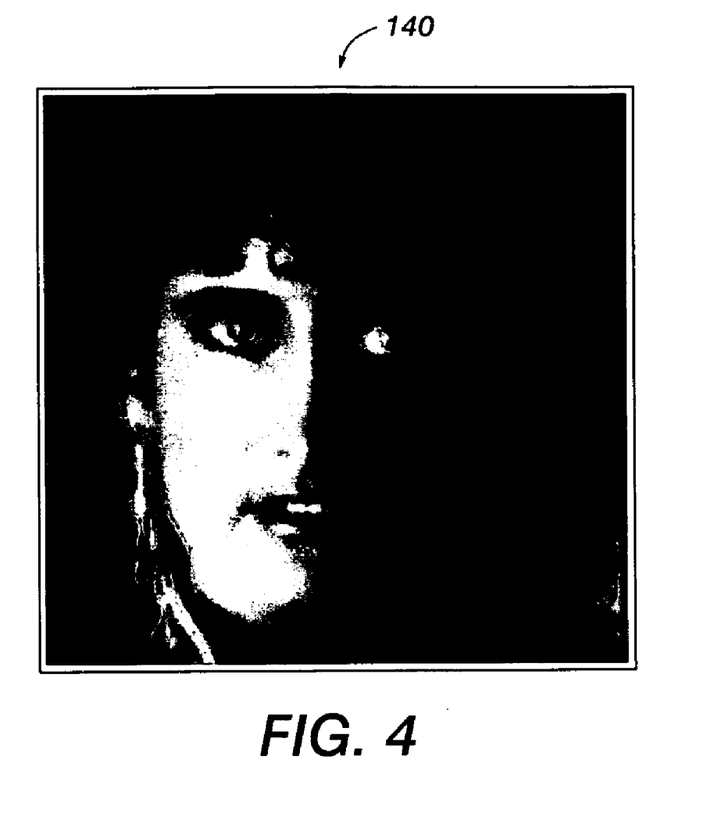
FIG. 4 is an illustrative example of a watermark image in accordance with an aspect of the disclosed embodiments.

In order to embed or overlay the watermark image shown in FIG. 4, it is necessary to compute the corresponding image areas of the watermark image as illustrated in the array of FIG. 5. After calculating the variance values between the target image and the watermark, the resulting variance being depicted in array 610 of FIG. 6, it is then possible to analyze or sort the variances, rendering—in this case—the five highlighted entries (620) in the array of FIG. 6 as the lowest variance areas, and thus the optimized locations for embedding of the watermark.

Figure 6:
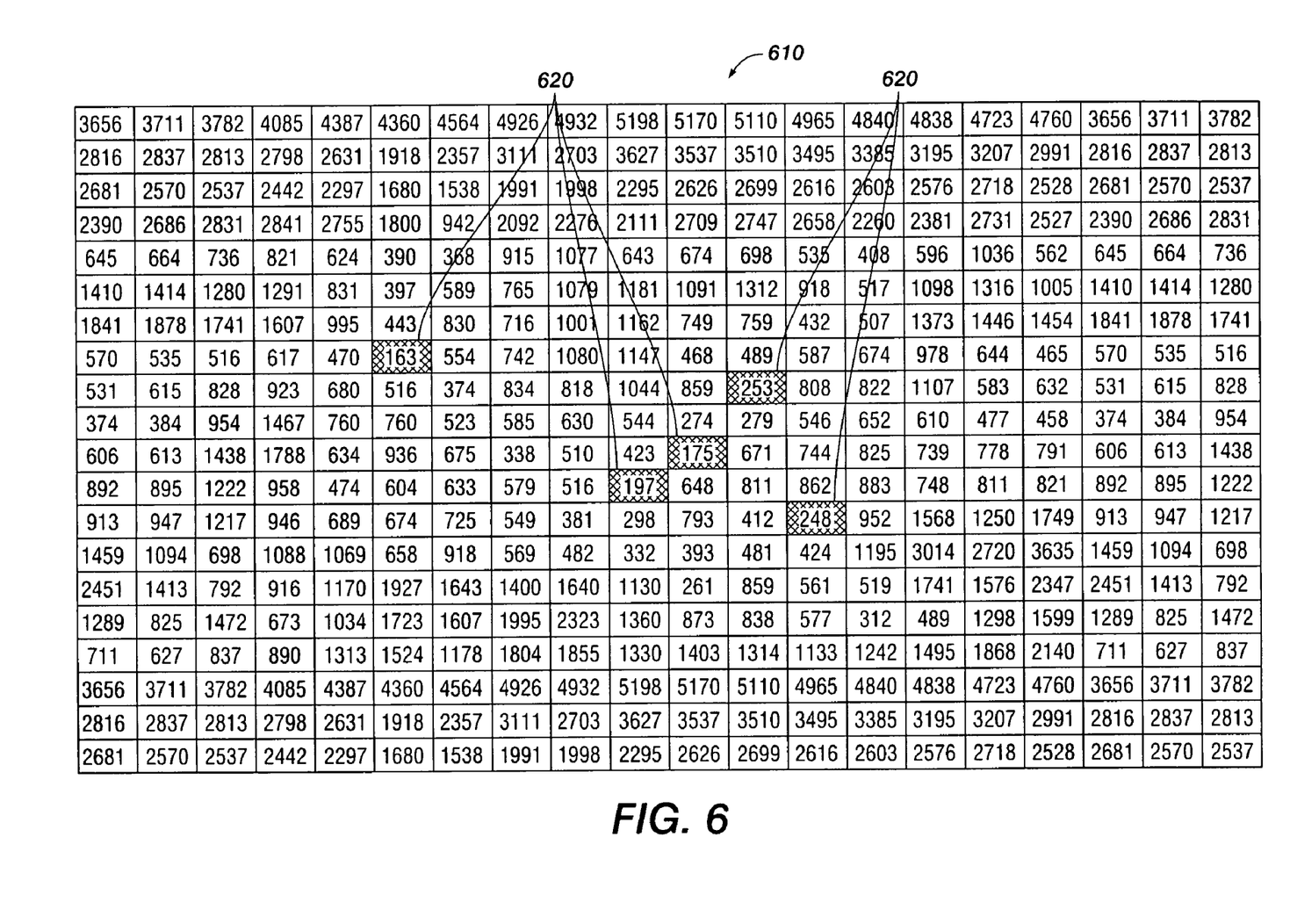
FIG. 6 is an illustrative example of the data array calculated from a characteristic metric relating to the data of FIGS. 3 and 5 in accordance with one embodiment.

Returning to FIG. 1, using only the similarity criteria for example, the method of determining an optimal location of the watermark is completed by the comparison described above relative to the examples, where the resultant array of FIG. 6 (divided image areas 620) are identified at operation 170, and the watermark is then overlaid or embedded into the target image at those locations, producing the watermarked digital image 174.

A similar processing can be performed for the contrast criteria at operations 128 and 170 if FIG. 1. A second embodiment of the method is to use an automatic image enhancement (AIE) based contrast calculation. Such a characteristic metric may be established by following the method outlined in U.S. Pat. No. 5,450,502 for a "IMAGE DEPENDENT LUMINANCE ENHANCEMENT," by R. Eschbach et al. issued Sep. 12, 1995, and hereby incorporated by reference in its entirety. For certain kinds of watermarks, it can be assumed that the watermark is best located in image regions of low contrast. This can be done by separating the image into a number of regions. For simplicity, assume non-overlapping regions, though overlapping and multi-scale regions are understood variations of the described approach. Assuming 10×10 areas as used for example in FIG. 7, it is possible to compute the local contrast, preferably using the histogram variance method outlined in U.S. Pat. No. 5,450,502. In the histogram variance method, N histograms are derived—in the example 10×10=100 histograms—that are then sorted according to variance of the histogram, with a high variance indicating a low contrast and vice versa. One can now use a fixed threshold to find areas of a pre-specified low contrast attribute, or one can alternatively find the M areas with the lowest contrast (largest variance value).

Figure 7:
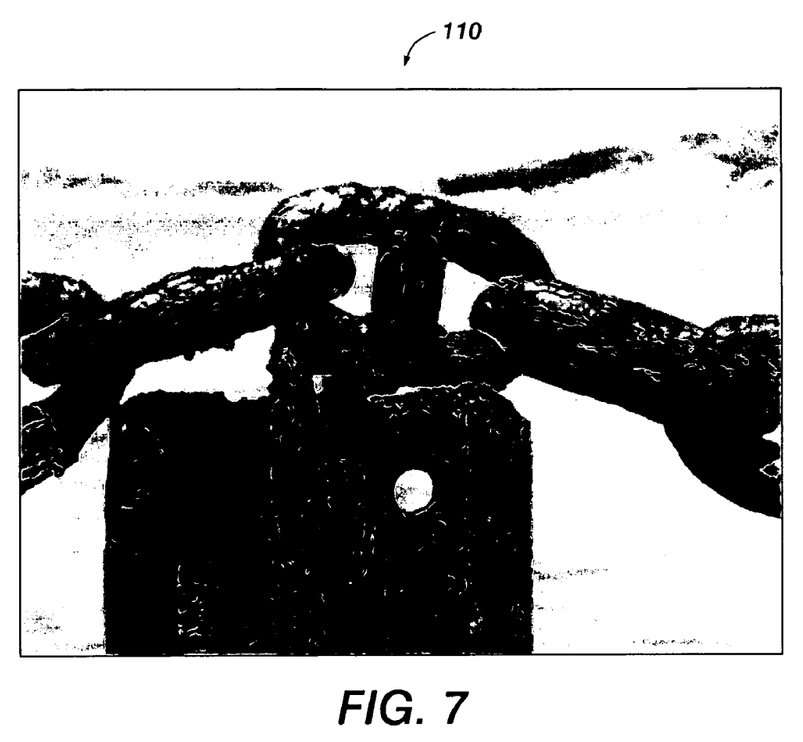
FIG. 7 is an illustrative example of another target image in accordance with an aspect of the disclosed embodiments.
Figure 8:
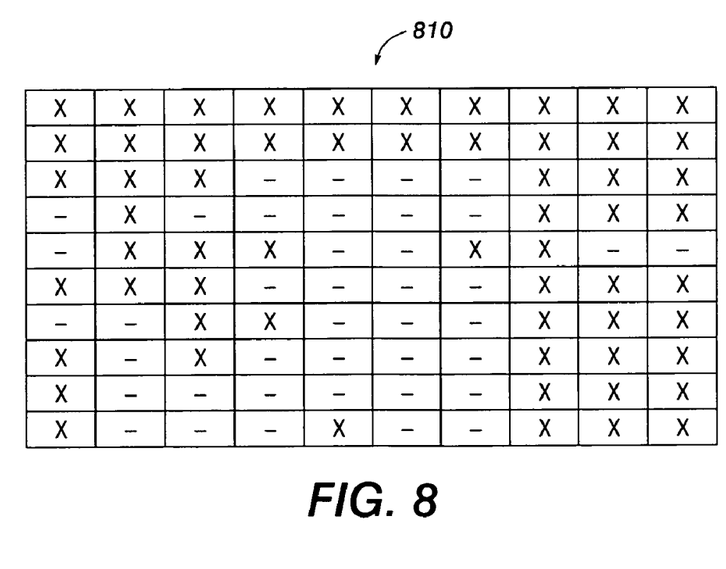
FIG. 8 is an illustrative example of the data derived from an analysis of areas of FIG. 7.

FIG. 7 shows a target image and the array 810 in FIG. 8 gives the corresponding overlay areas for 10×10 areas of the target image, assuming a fixed threshold in the contrast variance metric. In the disclosed example, it is assumed that the "best" overlay areas are those with the least image contrast (indicated by an "X" in array 810), since the image contrast will act as localized noise with respect to the watermark. It will, however, be appreciated that this applies in the case where it is desirable to view the watermark—for example a visible watermark overlay using a glossmark. In the opposite case, where desirable to hide the watermark, it may be preferable to place the watermark in areas having greater image contrast.

Yet a third embodiment for the method by which an optimal watermark location is determined involves the image value range characteristic as noted above. In this embodiment, perhaps the simplest, area selection is based on the input image value range. The basis for this characteristic is the assumption that any coding or modulation of the image data to embed a watermark in the target image data requires that the target image act as an information carrier. Hence, the data of the target image must provide sufficient image data in a local area to serve as the information carrier for the watermark. The image value range is simply defined based on the watermark criteria, and in general will limit the useful area to exclude the extreme ends of the image. In other words, areas of the target image that would be most suitable for coding a watermark are mid-tone areas, whereas the totally white areas or fully saturated color areas would be the least suitable.

Figure 9:
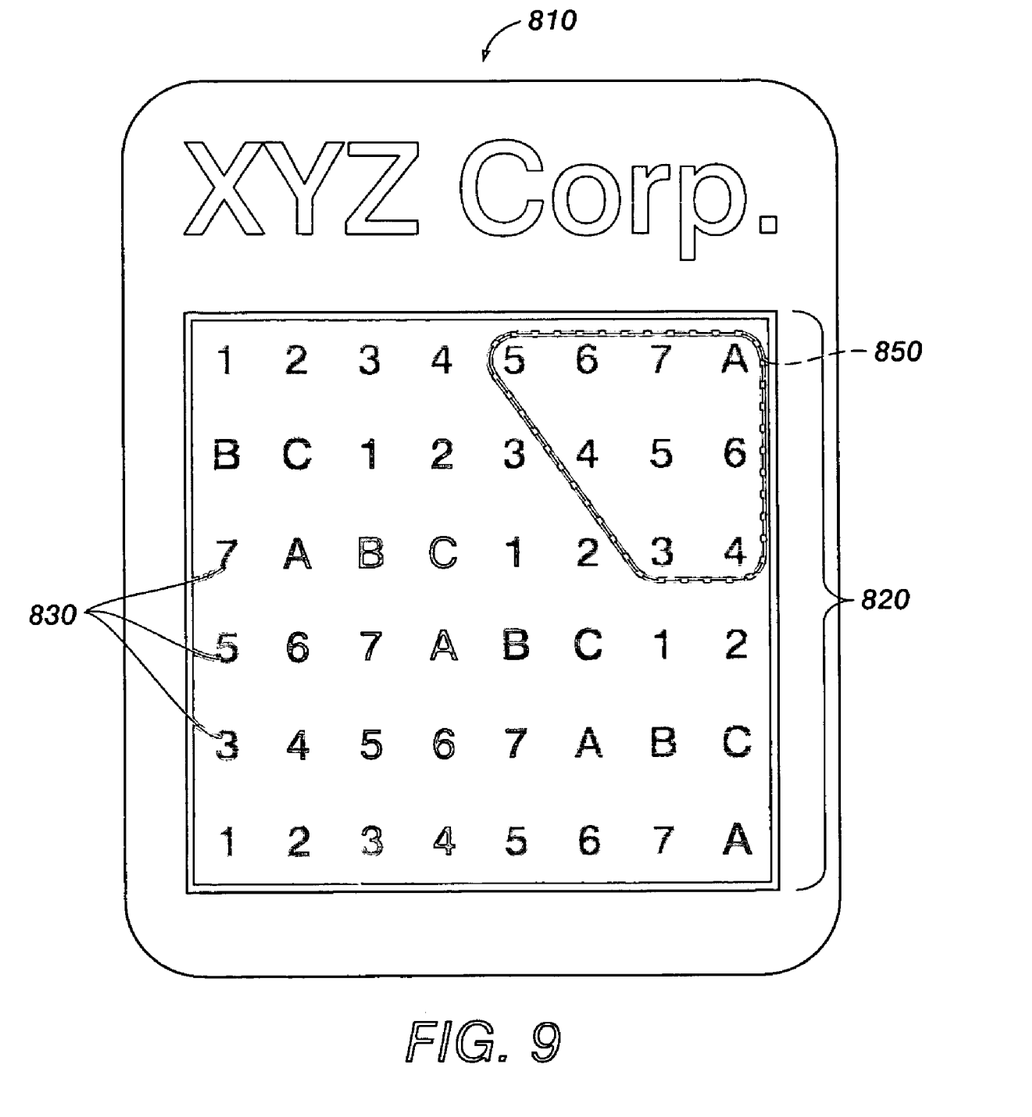
FIG. 9 is an exemplary output illustrating an aspect of the disclosed embodiments.

The following example illustrates the importance of the system and methods disclosed herein to automatically identify preferred or "best" watermark locations in a target digital image. Consider the scenario, in which a unique ID number is to be placed visibly over an image. In order to understand this example the reader is referred to FIG. 9, where there is depicted an identification card 810 having a person's photograph in region 820 overlaid with a repeating ID number 830. Although for purposes of illustration the ID number was simply placed over the image, in actual applications the watermark (ID number) would typically be much less visible. In the example, the ID number 830 is repeated over the image 820. On careful examination, one sees that the digits in several regions (e.g., upper right region 850) are virtually invisible in the image, despite the extreme nature of this type of embedding. When using any form of watermark, the general watermark contrast will be reduced and the numbers will be much less visible in order to not to destroy the image for identification purposes.

Knowledge of the watermark size, as well as knowledge of the optimized watermark areas would allow an automated system to assure that the complete ID is readable, even though parts of the ID are obscured in every instance of the ID number string (e.g.: the first portion of the ID is visible in one region of the image, a second portion in another region, and a last portion in yet a further region). This will encapsulate sufficient overlap to uniquely read the entire ID number even though there might not be a single area in the target image sufficiently large to hold the entire watermarked ID number.

As briefly mentioned above, the three criteria described in detail above may be employed, alone or in combination with one another (or other criteria) to determine a preferred location within an image to apply a watermark. Use of the system and method described above also requires that an instruction or requirement be established to indicate whether the process is to optimize visibility or "invisibility" of the watermark (i.e. overlaying in dissimilar or similar image areas). Next, a determination must be made as to which of the criteria will be employed to make the location determination. If more than one criterion is employed, the weighting of each criterion should also be established in relation to the particular intent of the watermark. Such weighting or other parameters (e.g., thresholds for contrast, variance, etc.) are then employed during the processing of the target image and/or the watermark image. Both, as indicated in FIG. 1 are processed to produce a "low resolution map" of the image, such as the 20×20 and 4×4 arrays for the target (132) and watermark (158) images respectively. Subsequently, the analysis of the images proceeds in accordance with the selected criteria ((i) image/watermark value similarity, (ii) image/watermark contrast similarity; and (iii) image value range), and the result is likely an array 610 as depicted in FIG. 6, where the processed data is retained as a "map." The areas of the map can then be sorted (based upon the pre-defined preferences (e.g., ascending or descending order), and the first N areas will then be identified as the preferred locations into which the watermark is embedded.

As a further example, consider the situation where a glossmark is to be embedded into a target image so that upon printing of the target with the glossmark, the mark will be visually unobtrusive, but nonetheless detectable. In such a situation, the image value range criteria is of particular import because areas with too much or too little toner are undesirable for the embedding of glossmarks. Hence, the image value range criteria would be used to rule out certain areas of the target image. Next, the contrast similarity criteria would be applied, but in this case to the target image only; assuming that even low contrast portions of the glossmark should be visible results in a "constant" contrast map for the glossmark image. The result of the contrast similarity criteria would then be employed to select areas with minimal variance as preferred locations for embedding the mark.

In yet a further application of the methods described herein, the areas identified for embedding the mark may be further employed to control the size of the watermark to be applied. For example, if a plurality of adjacent areas are suitable (e.g., above a contrast variance threshold), then it may also be possible to agglomerate the areas so as to provide a larger region (consisting of adjacent analysis areas) in which the watermark may be embedded. In other words, the size (magnification) of the watermark may be increased to cover more than a single area.

Figure 10:
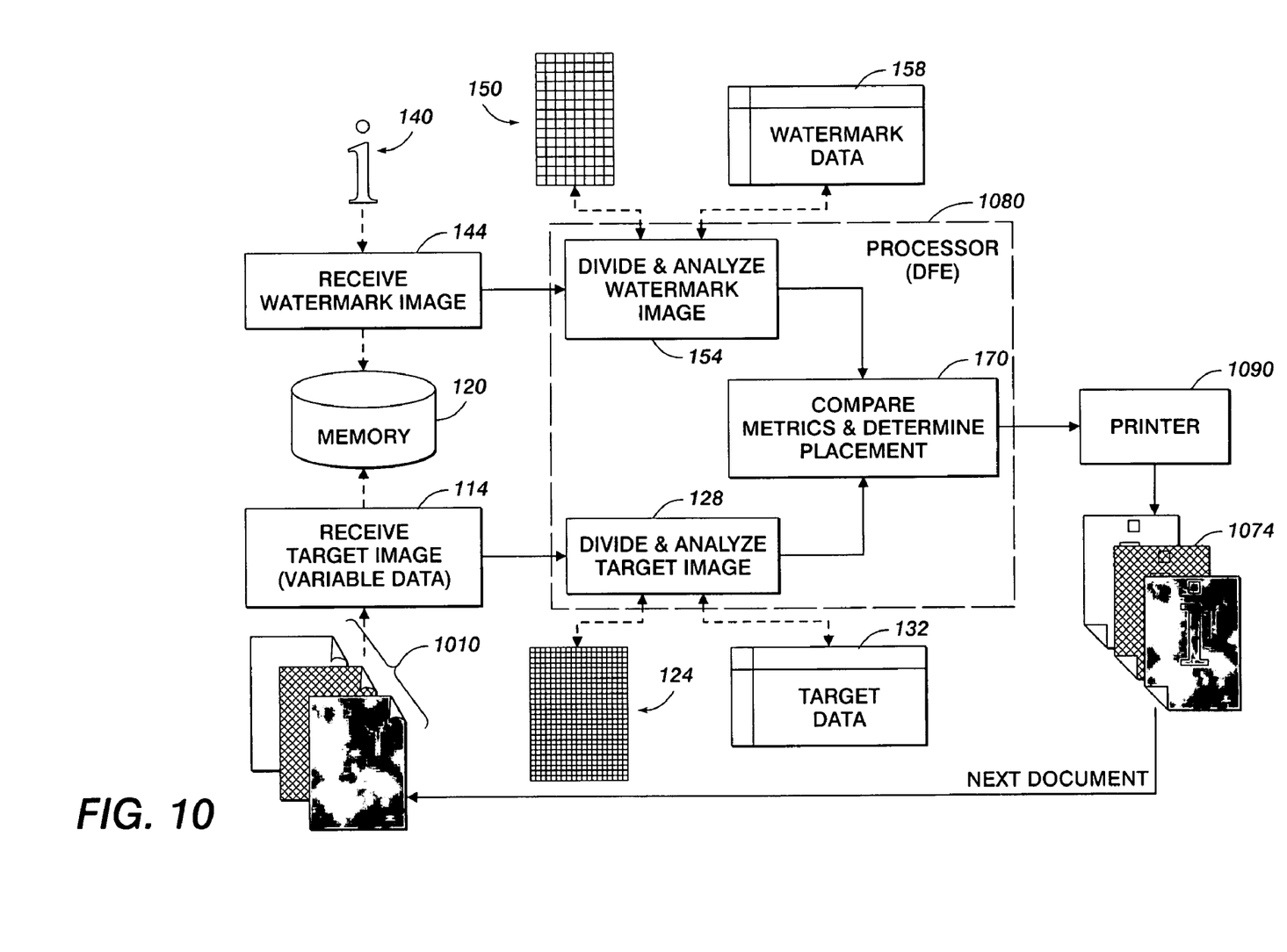
FIG. 10 is an alternative schematic illustration a variable data system and method for carrying out an embodiment of the invention.

The disclosed system and method further find application in the production of variable or on-demand documents as depicted for example in FIG. 10, particularly when such documents need to be rendered with an image-wise watermark. Recognizing that in variable print output (variable input target images 1010), the target image may vary with each printed document. In such a situation, the previously described process may be applied on a document-by-document basis in order to assure that the resulting output documents 1074 each have a watermark displayed in a preferred location of the output document—regardless of the fact that the content of the document may change from one document to the next. It will be appreciated that the system and methods described above emulate, to some level, what experienced graphic designers might do in selecting the location(s) for watermarks—thereby adding "intelligence" as opposed to simply applying a watermark redundantly over entire image.

Those knowledgeable with variable data printing system will recognize that the schematic illustration of FIG. 10 identifies several components and nodes of know production printing environments. The various operations described herein may, therefore, be performed on a digital front end (DFE) device 1080 or other pre-press processors that are suitable for receiving image data, including watermark images and variable input data, storing the data I a memory and then processing the data to produce a stream of information that may be employed to drive a printing system (printer 1090) such as a digital xerographic printer—whether black/white, highlight color or full color. The output of such printers may, therefore, incorporate variable print information as well as optimally placed image-wise watermarks, without the requirement of user intervention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, operating on a processor associated with a printing system, for determining a location for an image-wise watermark in relation to a target image stored in memory associated with the printing system, comprising:
    analyzing the target image by dividing the target image into a plurality of smaller areas and determining a characteristic metric for each of the areas thereof;
    determining, based upon the characteristic metric, at least one of a plurality of smaller areas for the image-wise watermark image to be overlaid onto the target image, wherein the characteristic metric is image value range and is determined as a function of the range of image data within areas of the target image; and
    the printing system then overlaying the image-wise watermark at the at least one of a plurality of smaller areas when the target image is printed.

2. The method of claim 1, further comprising receiving variable data for the watermark image and generating a watermark image incorporating the variable data.

3. The method of claim 1, further comprising receiving variable data for the target image and generating a target image incorporating the variable data.

4. A method, operating on a processor associated with a printing system, for determining a location for an image-wise watermark in relation to a target image stored in memory associated with the printing system, comprising:
    analyzing the target image by dividing the target image into a plurality of smaller areas and determining a characteristic metric for each of the areas thereof, wherein the characteristic metric is image contrast and is determined as a function of a difference between contrast levels for the areas of the target image and the watermark image;
    determining, based upon the characteristic metric, at least one of a plurality of smaller areas for the image-wise watermark image to be overlaid onto the target image; and
    the printing system then overlaying the image-wise watermark at the at least one of a plurality of smaller areas when the target image is printed.

5. The method of claim 4, further comprising receiving variable data for the watermark image and generating a watermark image incorporating the variable data.

6. The method of claim 4, further comprising receiving variable data for the target image and generating a target image incorporating the variable data.

7. A method for printing variable data with an image-wise watermark, comprising:
    receiving a target image into which an image-wise watermark is to be embedded and storing the target image in a memory associated with a printer;
    receiving a watermark image, said watermark image including variable data, and storing the watermark image in a memory associated with a printer;
    analyzing the target image, using a processor associated with the printer, by dividing the target image into a plurality of smaller areas and determining a characteristic metric for the areas thereof, wherein the characteristic metric is image contrast and further comprising determining image contrast as a function of a difference between contrast levels for the areas of the target image and the watermark image;
    analyzing the watermark image, using a processor associated with the printer, by dividing the watermark image into a plurality of smaller areas and determining a characteristic metric for the areas thereof; and
    determining, based upon at least one of the characteristic metrics, at least one location corresponding to at least one smaller area of the target image for at least one of said plurality of smaller areas for the image-wise watermark image to be overlaid onto the target image, and providing the at least one location to the printer.

8. A method for printing variable data with an image-wise watermark, comprising:
    receiving a target image into which an image-wise watermark is to be embedded and storing the target image in a memory associated with a printer;
    receiving a watermark image, said watermark image including variable data, and storing the watermark image in a memory associated with a printer;
    analyzing the target image, using a processor associated with the printer, by dividing the target image into a plurality of smaller areas and determining a characteristic metric for the areas thereof;
    analyzing the watermark image, using a processor associated with the printer, by dividing the watermark image into a plurality of smaller areas and determining a characteristic metric for the areas thereof, wherein the characteristic metric is image value range, and further comprising determining image value range as a function of the range of image data within areas of the target image; and
    determining, based upon at least one of the characteristic metrics, at least one location corresponding to at least one smaller area of the target image for at least one of said plurality of smaller areas for the image-wise watermark image to be overlaid onto the target image, and providing the at least one location to the printer.

* * * * *